United States Patent [19]

Anstine

[11] Patent Number: 5,059,844
[45] Date of Patent: Oct. 22, 1991

[54] SNAP RING FOR ELECTRIC MOTOR

[75] Inventor: William E. Anstine, North Canton, Ohio

[73] Assignee: Ametek-Lamb Electric, Kent, Ohio

[21] Appl. No.: 445,365

[22] Filed: Dec. 4, 1989

[51] Int. Cl.$^5$ .............................................. H02K 7/08
[52] U.S. Cl. ...................................... 310/90; 384/903; 29/596; 310/42
[58] Field of Search ...... 24/16 R, 20 R, 27, DIG. 10; 29/596, 732; 384/903; 310/90, 42, 66

[56] References Cited

U.S. PATENT DOCUMENTS

| | | | |
|---|---|---|---|
| 2,487,803 | 11/1949 | Heimann | 384/903 |
| 4,968,910 | 11/1990 | Meier et al. | 384/903 |

FOREIGN PATENT DOCUMENTS 3524360  2/1986  Fed. Rep. of Germany ........ 310/90

*Primary Examiner*—Steven L. Stephan
*Assistant Examiner*—Judson H. Jones
*Attorney, Agent, or Firm*—Renner, Kenner, Greive, Bobak, Taylor & Weber

[57] ABSTRACT

A snap ring is provided for receipt within a circumferential groove of a bore to maintain a motor shaft and bearing assembly within a housing. The ring has an open sector to allow for flexibility. In one embodiment, a number of lobes, defined by tapered inwardly declining surfaces extend from the ring and protrude from the groove into the bore. As a bearing is urged past the groove, the lobes are urged into the groove to allow the bearing to pass. Once the bearing has cleared the groove, the spring-like nature of the ring causes the lobes to again extend into the bore such that bottom surfaces of the lobes engage a top surface of the bearing, retaining the bearing and shaft assembly within the bore. In another embodiment, the ring has a number of lobes defined by tapered outwardly declining surfaces, while a third embodiment includes lobes defined by alternating inwardly and outwardly tapered declining surfaces.

17 Claims, 2 Drawing Sheets

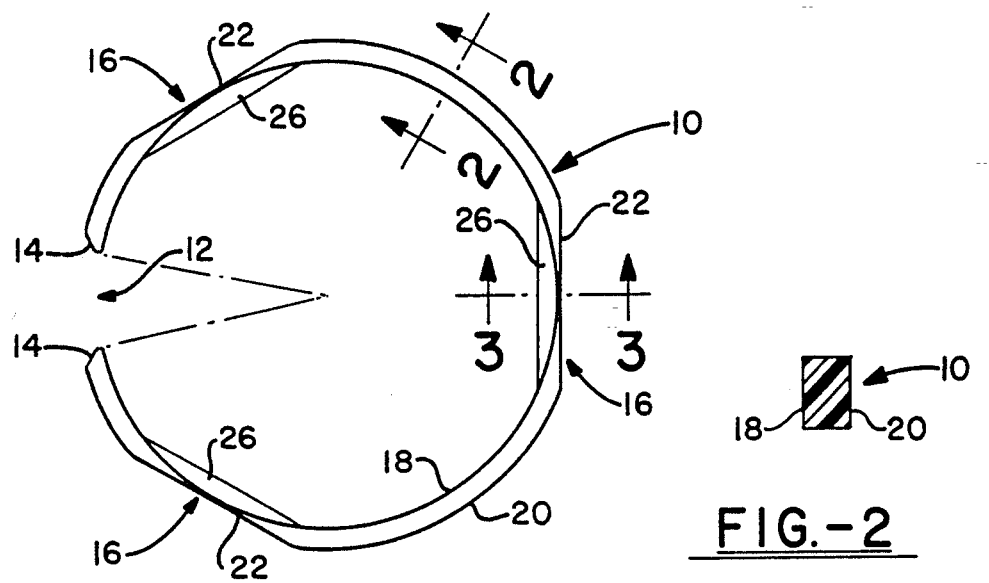
FIG.-1
FIG.-2
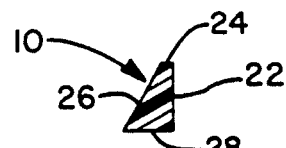
FIG.-3
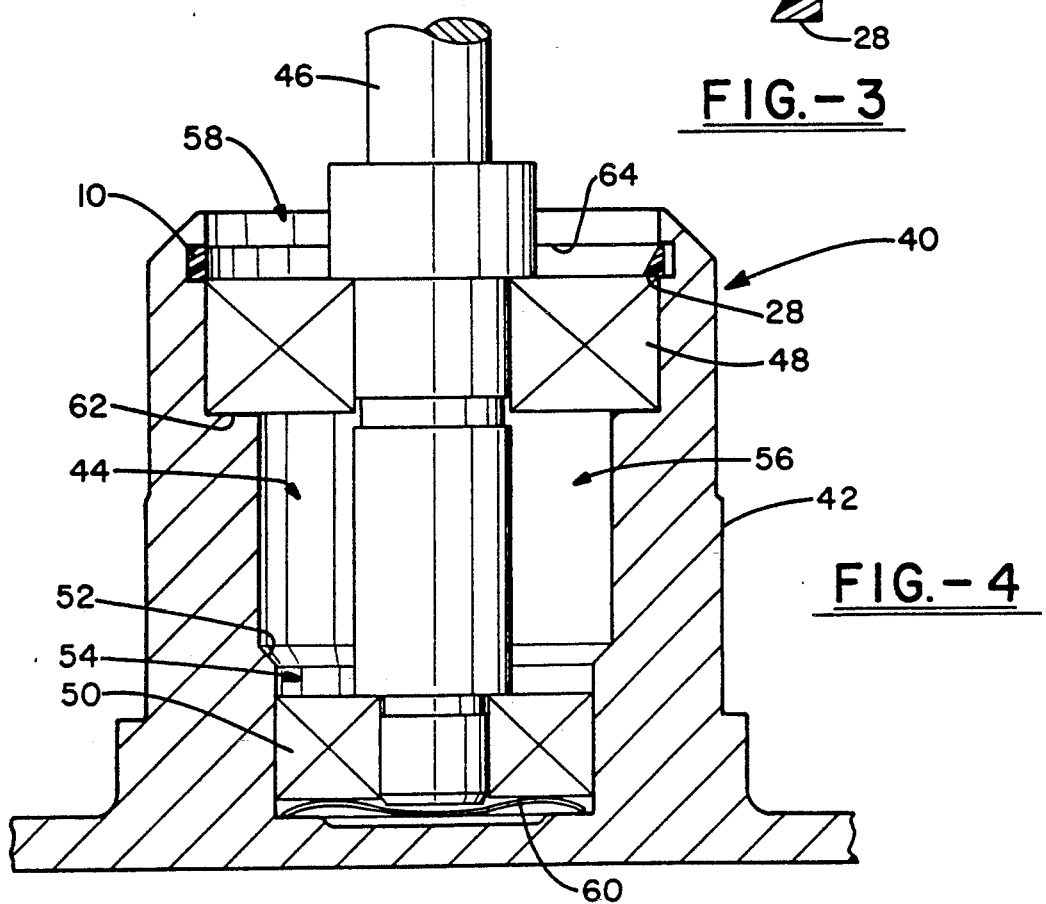
FIG.-4 ically, a special tool is used for placing and/or removing the retaining ring from the groove. Accordingly, the prior art techniques and structures have been labor intensive, and particularly difficult to implement if the motor shaft maintains elements thereon which obstruct access to the bore when the shaft and bearing are in place. By way of example, if a fan is maintained on the shaft in juxtaposition to the opening of the bore, the presence of the fan obstructs access to the bore for implementation of the retaining ring. Accordingly, placement of the fan on the shaft must occur after the shaft and bearing have been received by the bore.

SNAP RING FOR ELECTRIC MOTOR

TECHNICAL FIELD

The invention herein resides in the art of retention devices and, more particularly, to a retaining ring for a shaft and bearing assembly in a motor housing.

BACKGROUND ART

It is well known that the assembly of a motor often requires the placement of component parts thereof into a housing. Typically, the motor shaft is mounted on bearings to be received by a housing bore. Previously, it has been known to secure the bearing and shaft assembly within the bore by a retaining ring received within a circumferential groove about the bore sidewall, the retaining ring engaging the shaft and bearing assembly. In such prior art structures, the retaining ring is placed within the groove after the bearing and shaft assembly has been appropriately positioned within the bore. Typ- There is clearly a need in the art for a shaft and bearing retainer that will accommodate "blind" placement of the bearing and shaft assembly into the bore such that insertion of the assembly into the bore will actuate a keeper or retainer without need for access to the bore after the shaft and bearing have been placed therein. In other words, it is desired that a motor shaft may be placed and secured within the bore of a motor housing in a pre-assembled condition such that elements may be retained on the shaft at the time of its placement, making access of tools into the bore unnecessary.

DISCLOSURE OF INVENTION

In light of the forgoing, it is a first aspect of the invention to provide a snap ring for an electric motor which facilitates blind assembly of the motor bearing and shaft assembly into a housing bore.

Another aspect of the invention is the provision of a snap ring for an electric motor which securely engages the bearing, yet is easily removable for disassembly.

Yet a further aspect of the invention is the provision of a snap ring for an electric motor which is easily adapted for use with existing motor designs.

Still a further aspect of the invention is the provision of a snap ring on an electric motor which is inexpensive to manufacture and simple to use, while being reliable and durable in operation.

The foregoing and other aspects of the invention which will become apparent as the detailed description proceeds are achieved by a snap ring for retaining a motor shaft within a housing, comprising; a generally circular body member having a center, an inner circumferential surface, and an outer circumferential surface, said body member being open at a sector thereof; and a plurality of lobes extending from one of said circumferential surfaces away from the other of said circumferential surfaces.

Other aspects of the invention are obtained by a motor shaft and bearing assembly, comprising; a housing having a bore therein; a motor shaft received by a bearing, said shaft and bearing being received within said bore; and a snap ring interposed between said bore and shaft for securing locking engagement of said shaft within said bore.

BRIEF DESCRIPTION OF DRAWING

For a complete understanding of the objects, techniques and structure of the invention reference should be made to the following detailed description and accompanying drawings wherein;

FIG. 1 is a top plan view of a snap ring according to a first embodiment of the invention;

FIG. 2 is a cross sectional view of the snap ring of FIG. 1 taken along the line 2—2;

FIG. 3 is a cross sectional view of the snap ring of FIG. 1 taken along the line 3—3;

FIG. 4 is a cross sectional view of a motor housing showing a bore receiving a shaft and bearing assembly retained by the snap ring of FIG. 1;

Figure 6:
FIG. 6 is a cross sectional view of the snap ring of FIG. 5, taken along the line 6—6.

Referring now to the drawings and more particularly FIG. 1, it can be seen that a snap ring according to the invention is designated generally by the numeral 10. As shown, the snap ring 10 is of a basically circular configuration with alterations or modifications at four areas thereof. As shown, the snap ring 10 has an open sector 12, causing the ring to be discontinuous. While the size of the open sector 12 may vary, it is preferred that the same cover an arc of 15°-30°, as measured from an angle having its apex at the center of the ring 10. As shown, the ends of the ring 10 on either side of the open sector 12 are preferably rounded or radiused as at 14.

The ring 10 is further modified in the areas 16 as shown. While three such areas 16 are shown in the drawing of FIG. 1, it will be appreciated that various numbers of such modified areas could satisfy the purpose of the instant invention. It will further be noted that the modified areas 16 are preferably equally spaced about the circumference of the ring 10, although such is not necessarily required for achieving the objects of the invention. In the preferred embodiment shown, the three modified areas are equally spaced 120° apart.

As shown in FIG. 2. the ring 10, preferably has a rectangular cross section in the unmodified areas, having a surface 18 defining an inner radius, and a surface 20 defining an outer radius. The top and bottom surfaces interconnecting the side surfaces 18, 20 are preferably flat, parallel to each other, and normal to the side surfaces.

As shown in FIG. 3, the modified areas 16 are of triangular cross section, having a planar edge surface 22 formed by a plane perpendicular to the top and bottom surfaces of the ring 10 and passing in close juxtaposition to the inner radial surface 18. Accordingly, in the regions 16 only a small top surface 24 is present in the ring 10. In a preferred embodiment, the surface 24 is approximately 20% of the normal width of the top surface of the ring 10 between the inner and outer radial surfaces 18,20. A declining plane 26 protrudes within the inner radius of the ring 10, declining from the top surface 24 to a point of interconnection with the bottom surface 28. Accordingly, the declining surfaces 26 define tapered lobes which extend inwardly of the inner circumferential surface 18 of the snap ring 10 at spaced intervals thereabout. In a preferred embodiment, each of the lobes occupies a sector of 20°-40°.

In the preferred embodiment of the invention, the snap ring 10 is of a spring-type material, preferably plastic, such that it is flexible, expandable, and with a memory to return to the normal or natural position of FIG. 1 after it has been deformed and released. Obviously, the degree of deformation must not exceed the elastic limit of the element. While spring steel can certainly provide the necessary characteristics, it has been found that suitable plastics such as DELRIN, the trademark for a product manufactured by DuPont, are quite satisfactory for such applications.

In FIG. 4, the numeral 40 generally designates a motor housing 42 having a bore 44 therein adapted for receiving a motor shaft 46 having an upper larger bearing 48 and a lower smaller bearing 50 attached thereto. As will be appreciated by those skilled in the art, the shaft 46 is adapted for rotation within the bearings 48, 50. The bore 44 includes an abutment shoulder 52 and a narrower lower bore portion 54. It will be appreciated that the diameter of the lower bore portion 54 is substantially equal to that of the bearing 50 for purposes of receiving the same. It should also be noted that the bore 44 also includes a middle bore portion 56 and an upper bore portion 58, the three bore portions 54, 56, 58 being concentric and of increasing diameter. Of course, the specific configuration of the bore 44 is generally incidental to the concept of the snap ring presented herein. It should be understood that various bore configurations could be employed within the teachings of this invention.

Maintained at the bottom of the bore 44 is a wafer spring 60 adapted to be compressingly engaged by the bearing 50. At a point of desired compression, the bearing 48 engages the seat 62, limiting further movement of the bearing and shaft assembly into the bore 44. At such point in time, the wafer spring 60 is loaded to urge the shaft and bearing assembly 46, 48, 50 from the bore 44. However, the snap ring 10 maintained within the circumferential groove 64 of the bore 44 prevents such outward movement. The bottom surfaces 28 of the lobes 26 at the areas 16 of the ring 10 engage the top surface of the bearing 28 and restrict such outer movement.

In use, a snap ring 10 is first slightly compressed by urging the rounded ends 14 opposite the open sector 12 toward each other. This compression allows the ring 10 to be received within the upper bore portion 58 to a point of engagement with the circumferential groove 64. At such time, the ring 10 snaps into the groove 64 and remains therein, with the tapered surfaces 26 declining inwardly toward the center of the bore as shown. The radius of the ring 10 to the outer surface 20 is substantially equal to, but slightly less than, the radius of the groove 64. Further, the depth of the groove 64 is substantially equal to the width of the ring 10, defined by spacing between the inner and outer surfaces 18, 20. Accordingly, the ring 10 is substantially retained within the groove 64 with only the tapered declining surfaces 26 at the areas 16 extending into the bore from the groove. With the ring 10 so positioned, the shaft and bearing assembly 46, 48, 50 is passed into the bore 44. When the bottom surface of the bearing 48 engages the lobes 26 at the areas 16, the ring is deflected such that the lobes 26 move into the grooves 64 allowing the bearing 48 to pass. After the bearing has completely passed the ring 10 and groove 64, the memory of the ring causes it to assume its natural position with the lobes 26 again extending into the bore such that the bottoms 28 engage the top surface of the bearing 48 at three equally spaced positions, restricting outward movement of the bearing and shaft subassembly.

It should be appreciated that the opening in the ring at sector 12, the spring-type material from which it is manufactured, and the provision of the tapered lobes 26 all allow for the deflection of the ring 10 for passage of the bearing 48, with the subsequent return of the ring for securing the bearing after it has passed. The flat nature of the outer circumferential surface of the ring 10 at the areas 16 allows for deflection of those portions of the ring 10 when the bearing urges against the tapered lobes 26. The lobes 26 extend only so far from the grooves 64 as to be capable of substantially total retraction therein during passing of the bearing. Further, the discontinuity of the ring 10 at the open sector 12 allows for the ring to walk, flex, or appropriately deform within the groove 64 during such passing.

Removal of the ring 10 from the groove 64 can easily be accomplished by the insertion of a tool behind one of the ends 14 to urge the end from the groove 64. At that point, the end point 14 may be secured and the ring simply pulled from the groove.

Figure 5:
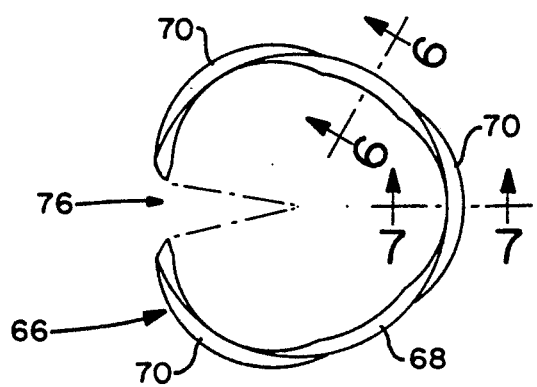
FIG. 5 is a top plan view of a snap ring according to a second embodiment of the invention.
Figure 7:
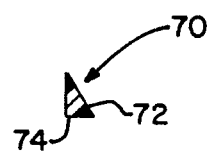
FIG. 7 is a cross sectional view of the snap ring of FIG. 5, taken along the line 7—7.

It will be readily appreciated by those skilled in the art that the concept of the invention may be readily expanded to external snap rings as distinguished from the internal snap ring of FIGS. 1-4. As shown in FIG. 5, an external snap ring 66 is generally configured as above, having a main body portion which is substantially rectangular in cross section as shown in FIG. 6, with a plurality of lobes 70 extending outwardly from the generally circular configuration thereof. As illustrated in FIG. 7, the lobes 70 are again of a generally triangular cross section, having an outwardly sloped surface 72 and a flat bottom locking surface 74. The ring 66 is again discontinuous at the open section 76 encompassing an arc of 15°-30° to facilitate placement, removal, and deflection of the snap ring 66.

The operation and utility of the snap ring 66 is similar to that of the snap ring 10. With the ring 66 received within a groove about an outer circumference of a cylindrical member, such cylindrical member may be mated in a bore having a complimentary groove or edge in an inner circumferential wall. Such circumferential wall deflects the lobes 70 such that the snap ring 66 is totally received within the groove of the cylindrical member until the groove of the bore and cylindrical member are aligned, at which time the elasticity and memory of the snap ring 66 urges the lobes 70 into the bore groove or over the bore edge. At such time, engagement of the surface 74 with the bore edge or lip of the bore groove achieves the desired locking engagement.

The specific design and configuration of the external snap ring 66 may, of course, vary. While it is preferred that there be three lobes 70 spaced uniformly about the circumference of the ring 66, each occupying a sector of 30°–60°, the specific number, spacing, and size may vary.

Figure 9:
FIG. 9 is a cross sectional view of the snap ring of FIG. 8, taken along the line 9—9.
Figure 8:
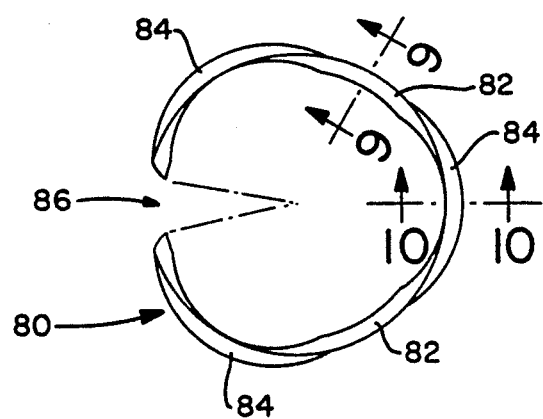
FIG. 8 is a top plan view of a snap ring according to a third embodiment of the invention.
Figure 10:
FIG. 10 is a cross sectional view of the snap ring of FIG. 8, taken along the line 10—10.

It will further be appreciated that a universal snap ring may be configured embodying a combination of the features of the snap rings 10, 66. As shown in FIGS. 8–10, a universal snap ring 80 is generally circular or ring-like in nature, but with both internally and externally extending lobes. In a preferred embodiment, the internally extending lobes 82 alternate with the externally extending lobes 84. Again, the snap ring 80 is discontinuous over an arc of about 15°–30° as at 86 to facilitate insertion and removal of the ring 80 and to accommodate flexure during use when positioning and engaging the ring in the receiving grooves.

As shown in FIG. 9, the lobes 82 are of triangular cross section and serve as the deflection lobes when the ring 80 is employed as an internal retaining ring as with the embodiment of FIGS. 1–4. When employed as an external retaining ring such as in FIGS. 5–7, the lobes 84, triangular in cross section, serve for the requisite deflection purposes as discussed above.

It should now be appreciated that the concept of the invention is the provision of a retaining ring in which lobes, fingers or the like protrude inwardly and/or outwardly from respective circumferential surfaces. The lobes have a tapered or angular surface for engagement with and deflection by a first member which is to be mated with a second member receiving the ring within a groove. Such deflection allows the ring to deflect into the receiving groove and subsequently recover to its undeflected state to engage a lip or edge of the first member when the two members are in requisite alignment. A flat surface on the ring opposite the tapered surface provides for engagement with the lip or edge of the first member.

Those skilled in the art will also appreciate that the profile of the lobes contributes significantly to the assembly and retention forces characteristic of the snap ring. The smaller the angle of the tapered surface across the width of the ring, the lesser the assembly force. Similarly, a square face on the retaining edge maximizes retention forces. An equal angle from both the leading end and retaining end, meeting at the center, will substantially equalize assembly and retention forces. The ratio of retention force to assembly force is a function of the profile of the lobes which may be tailored for special application such as tensioning or take-up of axial looseness.

Thus it can be seen that the objects of the invention have been satisfied by the structure presented hereinabove. While in accordance with the patent statutes only the best mode and preferred embodiment of the invention has been presented and described in detail, it is to be understood that the invention is not limited thereto or thereby. Accordingly, for an appreciation of the true scope and breath of the invention reference should be made to the following claims.

What is claimed is:

1. A snap ring for retaining a motor shaft within a housing, comprising:
   a generally circular body member having a center, an inner circumferential surface, and an outer circumferential surface, said body member being open at a sector thereof; and
   a plurality of lobes extending from one of said circumferential surfaces away from the other of said circumferential surfaces, said lobes being tapered from a top surface of said body member to a bottom surface of said body member.

2. The snap ring as recited in claim 1, wherein said body member is of generally rectangular cross section, but for the area of said lobes which is generally triangular in cross section.

3. The snap ring as recited in claim 2, wherein said body member comprises a spring having a memory to return to an undeformed configuration after being deformed.

4. The snap ring as recited in claim 3, wherein said lobes extend outwardly from said outer circumferential surface away from said center.

5. The snap ring as recited in claim 3, wherein certain of said lobes extend inwardly from said inner circumferential surface toward said center, and other of said lobes extend outwardly from said outer circumferential surface away from said center.

6. The snap ring as recited in claim 3, wherein said lobes extend inwardly from said inner circumferential surface toward said center.

7. The snap ring as recited in claim 6, wherein said outer circumferential surface is truncated in an area radially opposite said lobes.

8. The snap ring as recited in claim 7, comprising three lobes and three associated truncated areas on said circumferential surface, said lobes and truncated areas being uniformly spaced about said body member.

9. The snap ring as recited in claim 1, wherein said opening at said one end lies in an arc of 15°–30° along said inner and outer circumferential surfaces.

10. The snap ring as recited in claim 1, wherein each said lobe occupies a zone on said body member of 20°–40°.

11. A motor shaft and bearing assembly, comprising:
    a housing having a bore therein;
    a motor shaft received by a bearing, said shaft and bearing being received within said bore; and
    a snap ring interposed between said bore and shaft for securing locking engagement of said shaft within said bore, said snap ring comprising a substantially circular body member having a plurality of lobes extending from a circumferential edge thereof, said lobes inter-engaging said bore and shaft.

12. The assembly according to claim 11, wherein said snap ring is discontinuous at a sector, defining an opening therein.

13. The assembly according to claim 12, wherein said lobes are substantially triangular in cross section.

14. The assembly according to claim 13, wherein said body member forms a spring.

15. The assembly according to claim 14, wherein said lobes of said snap ring are deflectable by axial movement of said shaft within said bore.

16. The assembly according to claim 15, wherein said snap ring is received within a groove between said bore and shaft.

17. A snap ring for retaining a motor shaft within a housing, comprising:
    a generally circular body member having a center, an inner circumferencial surface, and an outer circumferential surface, said body member being open at a sector thereof in an arc of 15°–30° along said inner and outer circumferential surfaces; and
    a plurality of lobes equally spaced about and extending from one of said circumferential surfaces away from the other of said circumferential surfaces.

* * * * *